United States Patent [19]

Schuurman

[11] 4,254,936

[45] Mar. 10, 1981

[54] BUTTERFLY VALVE

[75] Inventor: Pieter J. Schuurman, The Hague, Netherlands

[73] Assignee: Shell Oil Company, Houston, Tex.

[21] Appl. No.: 966,684

[22] Filed: Dec. 5, 1978

[30] Foreign Application Priority Data

Dec. 7, 1977 [GB] United Kingdom ............... 50942/77

[51] Int. Cl.³ ............................................. F16K 25/00
[52] U.S. Cl. .................................. 251/173; 251/298; 251/306
[58] Field of Search ............... 251/173, 162, 163, 306, 251/298, 172, 171

[56] References Cited

U.S. PATENT DOCUMENTS

| 1,813,126 | 7/1931 | Sheppard | 251/173 |
|---|---|---|---|
| 1,844,641 | 2/1932 | DeWein | 251/173 |
| 3,036,812 | 5/1962 | Wierzbicki | 251/173 |
| 3,817,490 | 6/1974 | Deeg | 251/298 X |
| 3,843,090 | 10/1974 | Schneider | 251/163 X |

Primary Examiner—Harold W. Weakley

[57] ABSTRACT

A butterfly valve for use in the control of gaseous fluids which comprises a valve disc having an annular sealing surface near its periphery, a flat annular valve seat provided in a housing accommodating the valve, and an actuating means for opening and closing the valve by bringing the valve disc sealing surface and the valve seat into cooperation, said valve seat containing an elastic sealing means which is adapted to be pressed against the sealing surface of the valve disc to enable a leakage-free closure of the valve.

3 Claims, 2 Drawing Figures

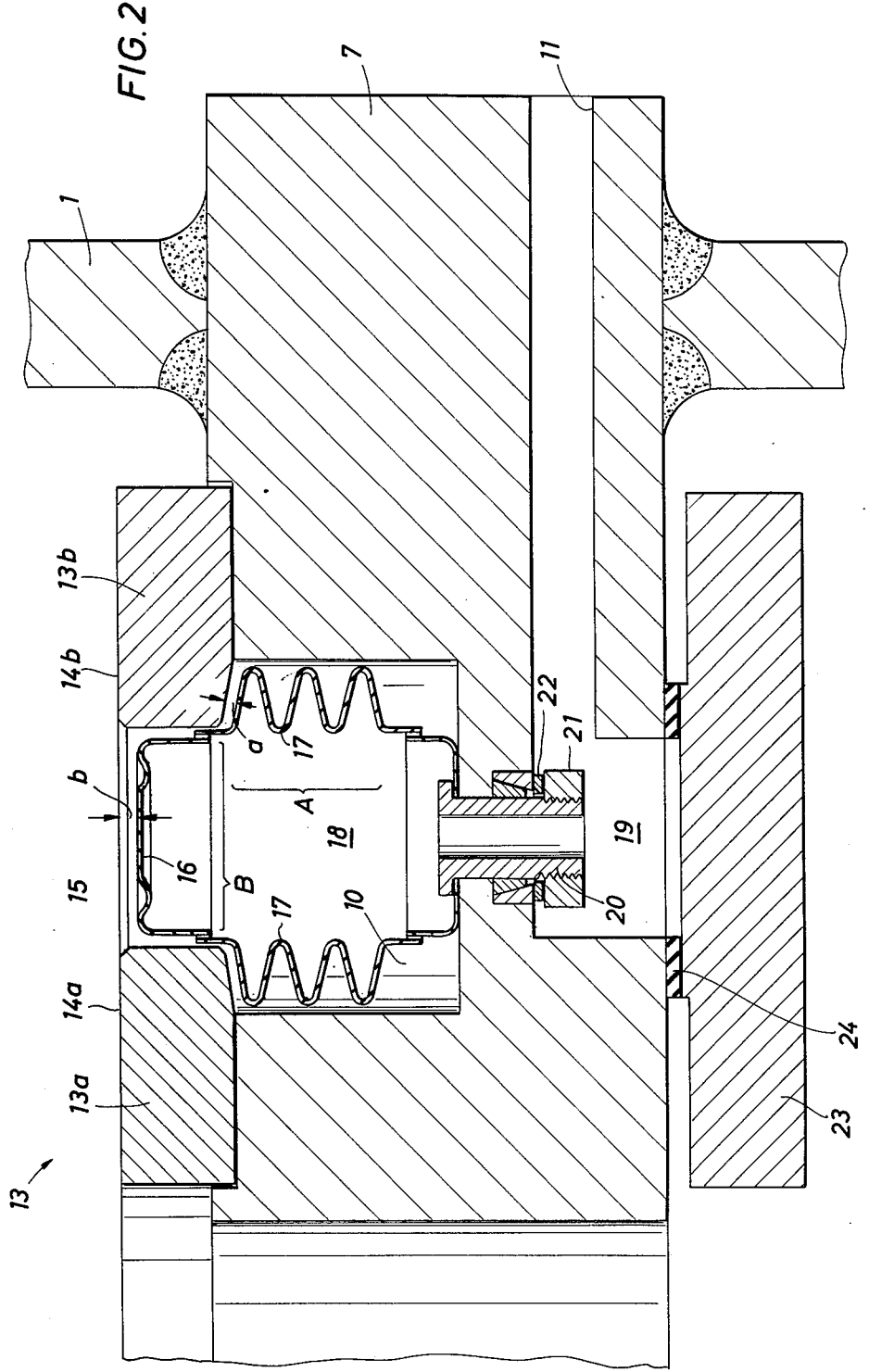

BUTTERFLY VALVE

BACKGROUND OF THE INVENTION

The invention relates to improvements in a butterfly valve for the control of gaseous fluids, comprising a valve disc having an annular sealing surface near its periphery, a flat annular valve seat provided in a housing accommodating the valve, and actuating means for opening and closing the valve.

Butterfly valves are routinely employed for the control of gaseous fluids in services for which some degree of leakage can be tolerated across the valve. The propensity of such valves, particularly the larger valves often having a diameter of one meter or more, to provide a less than leak-proof seal is well known. For instance, Great Britain patent 901,607 recognizes that leakage is a problem and provides a means for its detection.

In a variety of industrial applications, however, it is absolutely necessary that leakage past a valve be prevented. For instance, such is the case when there is a danger of the escape of a toxic substance or when an undesirable reaction occurs between two different fluids separated by the valve. The latter situation often arises in regenerative processes in which there is a periodic switching between utilization of two or more different treating fluids. It is an object of this invention to provide a butterfly valve suitable for leak-proof services in applications such as these.

Commonly-assigned copending application bearing Ser. No. 769,811 and filed Feb. 17, 1977, provides a solution to the leakage problem associated with the use of butterfly valves according to which a double seal is provided between valve disc and valve seat. A purge fluid under high pressure is injected into the space between the two seals to provide a barrier to leakage across the valve. This approach to solving the leakage problem is applicable both in a valve with an annular sealing surface near the periphery of the valve disc cooperating with a flat annular seat, as well as in a valve with a circumferential seal between the periphery of the valve disc and an accommodating seat. In the latter of these two butterfly valve types, to which the copending application is particularly directed, the employment of purge fluid at the seal is generally preferred over the use of resilient seat materials as is illustrated by Great Britain Pat. No. 901,607 and U.S. Pat. No. 2,705,016. However, in many applications of butterfly valves to the control of gaseous fluids, it is undesirable to utilize a purge fluid type of seal, as, for instance, where the purge material introduces a source of contamination to the fluid on either side of the valve disc. The nature of the gaseous fluids contained by the valve and the processing to which these fluids are subjected often dictates that inert purge gases be used which are only obtainable with great expense and inconvenience.

SUMMARY OF THE INVENTION

According to the invention there is provided an improved butterfly valve characterized by fluid-tight closure comprising a valve disc having an annular sealing surface near its periphery, a flat annular valve seat provided in a housing accommodating the valve, and an actuating means for opening and closing the valve by bringing the valve disc sealing surface into cooperation with the valve seat, said valve seat being equipped with an elastic sealing means which is pressed against the sealing surface of the valve disc during valve closure.

DESCRIPTION OF THE PREFERRED EMBODIMENTS

In order to accomplish a sealing of the valve disc annular sealing surface against the flat annular valve seat over a full circumference of contact during valve closure, it is desirable that the movement of the butterfly disc in the valve according to the invention be achieved through the use of an actuating mechanism not cited in the plane of the valve disc and a support bridge for the spindle or shaft of the valve which is braced to the valve housing in a manner enabling the employment of a shaft which does not extend beyond the circumference of the valve disc. Valves of such configuration are currently proving very useful in many industrial services, particularly where good sealing performance is required of larger-sized butterfly valves.

According to the improvement afforded by the invention, the flat annular valve seat of a butterfly valve is provided with an elastic sealing means able to be pressed against the sealing surface of the valve disc during closure in order to provide a leak-proof seal. In one embodiment of the invention, the elastic sealing means comprises a flexible membrane. Preferably, the elastic sealing means also comprises a bellows which is situated in the valve seat housing and which is integrally attached to the membrane. The membrane is actuated by pressurizing, with an externally supplied source of fluid under pressure, the internal space bounded by the membrane and the bellows. While the valve is open, the membrane is positioned slightly below the surface of the annular valve seat. During closure of the valve, pressure from an external source is exerted upon the interior surfaces of the membrane and bellows to cause an expansion of the elastic sealing means which brings the membrane into contact with the sealing surface of the valve disc. A pressure within the membrane which is higher than that of gaseous fluid on either side of the valve disc assures a leak-proof seal.

The invention will now further be exemplified through reference to the accompanying drawings.

FIG. 2 is a detail on an enlarged scale showing the sealing function of the valve according to a preferred embodiment of the invention.

Figure 1:
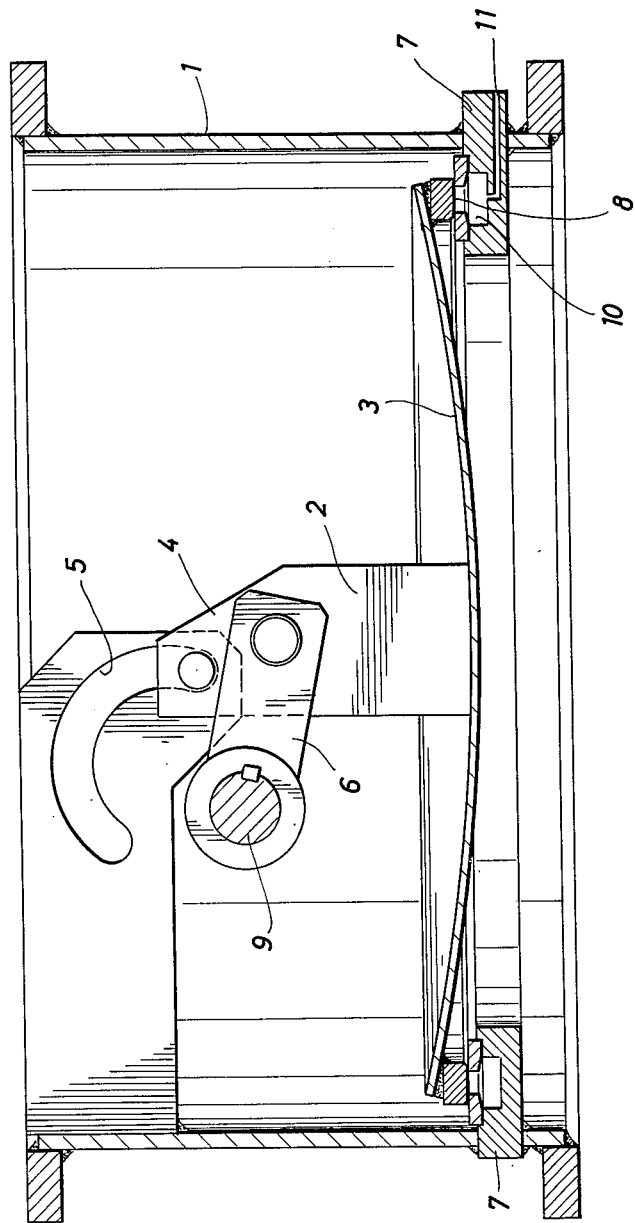
FIG. 1 is a diagrammatic view of a conventional butterfly valve to which the improvement of the invention can be applied.

Referring to the cross-sectional view of the valve in FIG. 1, the valve housing is designated by 1, which housing is adapted to be inserted in a fluid conduit, and includes means for receiving, supporting and actuating a butterfly valve 2, mainly consisting of a valve disc 3 and a support bridge comprising a valve frame part 4. This frame part comprises a number of supporting and guiding elements 5 and a shaft or spindle receiving element 6. A valve seat 7 is affixed in the housing and is adapted to cooperate with valve disc annular sealing surface 8 provided at the rim of valve disc 3. A valve-actuating shaft 9 is provided and connected with element 6. Valve elements 1 through 9 are in a general sense conventional for this type of valve.

The valve seat 7 comprises an annular space 10 connected with one or more channels 11 for the supply from an external source (not shown) of a fluid under pressure to the space 10. In FIG. 1 the annular space 10 is depicted as an empty space which is able to accommodate the elastic sealing means. For reasons of simplicity the elastic sealing means has been omitted from FIG. 1, since it is shown in expanded scale in the cross-sectional view of the valve seat provided by FIG. 2.

Referring now to FIG. 2, wherein the same reference numbers have been used for parts already identified in FIG. 1, the annular space 10 is covered by a flat annular seat surface member 13 consisting of concentric inner ring 13a and outer ring 13b with flat seating surfaces 14a and 14b, respectively, adapted for contact with the annular valve sealing surface 8. Between parts 13a and 13b a space 15 is present for accommodating a flexible membrane 16 which forms an integral part with bellows 17 housed within the space 10 and enclosed therein by parts 13a and 13b. The flexible membrane 16 and bellows 17 together form the elastic sealing means and here enclose an internal space 18 which is sealed except for communication with a source of pressurizing fluid. Through one or more channels, here a flanged bush 20, space 18 is in communication with a space 19 and in turn with inlet/outlet channel 11, through the open end of which connection can be made to the external source of pressurizing fluid. In FIG. 2, the bush 20 is fixed by nut 21, tightness being secured by packing 22. A flange 23 with packing ring 24 closes off space 19, which can be inspected by removal of the flange.

The operation of the elastic sealing means during the opening and closing of the valve is now described. Generally, movement of membrane 16 into or out of contact with the valve disc sealing surface is a function of fluid pressure within space 18. Raising or lowering the pressure within space 18 is simply accomplished by flow of a pressurizing fluid into or out of space 18, through passages defined by channels 11 and 20 and space 19. Control of the flow of this pressurizing fluid may be manual or automatic. Means for raising, lowering, or maintaining a constant pressure within space 18 are outside the scope of the butterfly valve of the invention; provision for such matters will be familiar to one skilled in the art.

The operation of the elastic sealing means is as follows: Starting with the sealing mechanism in inoperative position, i.e., with valve disc open to the flow of gaseous fluid across the valve, as shown in FIG. 2, membrane 16 has a clearance, b, with the plane of the valve seat and bellows 17 has a clearance, a, with the undersurface of the rings 13a and 13b. The valve is closed by bringing the disc into the position relative to the valve seat as is shown in FIG. 1. Then pressurizing fluid from an external source is introduced through channel 11 space 19 and bush 20 to space 18. As an alternative, space 18 is under an intermediate pressure from the fluid pressure source while the elastic sealing means is in its inoperative position, for reasons set out below, and the pressure then is increased. Under the influence of fluid pressure, the bellows 17 will stretch out and the membrane 16 will move towards the annular sealing surface 8 of the valve disc whereby first the clearance b will decrease to zero and thereafter the flexible membrane will be pressed against the valve disc sealing surface. To insure that the resulting seal will prevent leakage, the pressure in space 18 must be raised to a higher value than the highest pressure present in the gaseous fluid on either side of the valve disc.

It is preferred that clearance a be greater than clearance b in case the assistance of the stretching movement of the bellows is required for obtaining a leak-proof seal. However, it is not necessary that the clearance b be greater than the clearance a, which can be the case if the flexibility of part B including the membrane 16 is such that there will be left room for part B to expand further after part A has reached the end of its travel, i.e., has made contact with rings 13a and b. Although this alternative is somewhat more complicated in configuration, it may have advantage, for instance, for the situation in which the free space between the bellows 17 and the walls of annular space 10 is preferably sealed off while the valve is in open position to prevent that space from fouling with solid particulate carried along with the gaseous fluid flowing through the valve.

When the valve is to be opened, the pressure in the space 18 is reduced such that the sealing mechanism will return in its original unexpanded position, whereafter the valve will be opened by actuating shaft 9 with spindle-receiving element 6 and the associated guiding element 5. It is recommended that the pressure inside space 18 not be decreased so far as to permit collapsing of the membrane 16 and bellows 17. As an alternative, space 18 may be provided with suitable internals to delimit the collapse of membrane 16 and bellows 17 when space 18 is depressurized.

It also may be desired that, when the valve is in open position, measures be taken to prevent fouling of the above-mentioned free space between bellows 17 and the walls of space 10, the risk of fouling being greater when the valve is in the open position than in closed position since then said space is accessible to particulate contamination in the gaseous fluids. In this case, the space 18 can again be pressurized once the valve is open, so that the clearance, a, disappears and seals off said free space. The pressure must be interrupted before the valve is again closed in order to prevent damage to the membrane 16 during closure. As an extra safety measure against fouling, said space can be connected with a purge fluid source (not shown) for periodic flushing of the entire free space.

It will be clear that the embodiment shown in the figures and described above is only one example among many and that the invention is applicable in connection with any other elastic sealing means which is capable of being pressed against the annular sealing surface of the closed valve disc through pressurization from an external fluid source.

We claim as our invention:

1. A butterfly valve providing improved fluid-tight closure for the control of gaseous fluids which comprises
  (a) a valve disc having an annular sealing surface near its periphery,
  (b) a valve seat in a housing accommodating the valve, said seat having two concentrically-spaced annular seating rings with flat seating surfaces, said seat being affixed in said housing so that during the valve closure the flat seating surfaces of the two annular rings seal against the valve disc annular sealing surface, and said seat having an elastic sealing means disposed in the annular space between the seating rings which means has a hollow interior in communication with an externally-supplied fluid under pressure the action of which expands the elastic sealing means for contact with the sealing surface of the valve disc during valve closure,
  (c) first actuating means for opening the valve, and for closing the valve by bringing into contact the sealing surface of the valve disc and the flat seating surfaces of the valve seat annular seating rings, and (d) second actuating means supplying fluid under pressure to the interior of the elastic sealing means of the valve seat for bringing into contact the elastic sealing means and the sealing surface of the valve disc during valve closure.

2. A butterfly valve for the control of gaseous fluids comprising:

(a) a valve disc having an annular sealing surface near its periphery, (b) a valve seat having two concentrically-spaced annular seating rings with flat seating surfaces and an elastic sealing means disposed in the annular space between the seating rings, said elastic sealing means comprising a substantially flat membrane part and a bellows part, and said sealing means having a hollow interior in communication with an externally supplied fluid under pressure, the action of which expands the elastic sealing means, and (c) actuating means for opening the valve, and for closing the valve by bringing into contact the elastic sealing means and the sealing surface of the valve disc.

3. The valve of claim 2, wherein the elastic sealing means in its inoperative position does not extend across the plane of the flat seating surfaces.

* * * * *